Aug. 4, 1942.                S. LEE                    2,291,640
                         SEAT STRUCTURE
                    Filed April 18, 1941        3 Sheets-Sheet 1
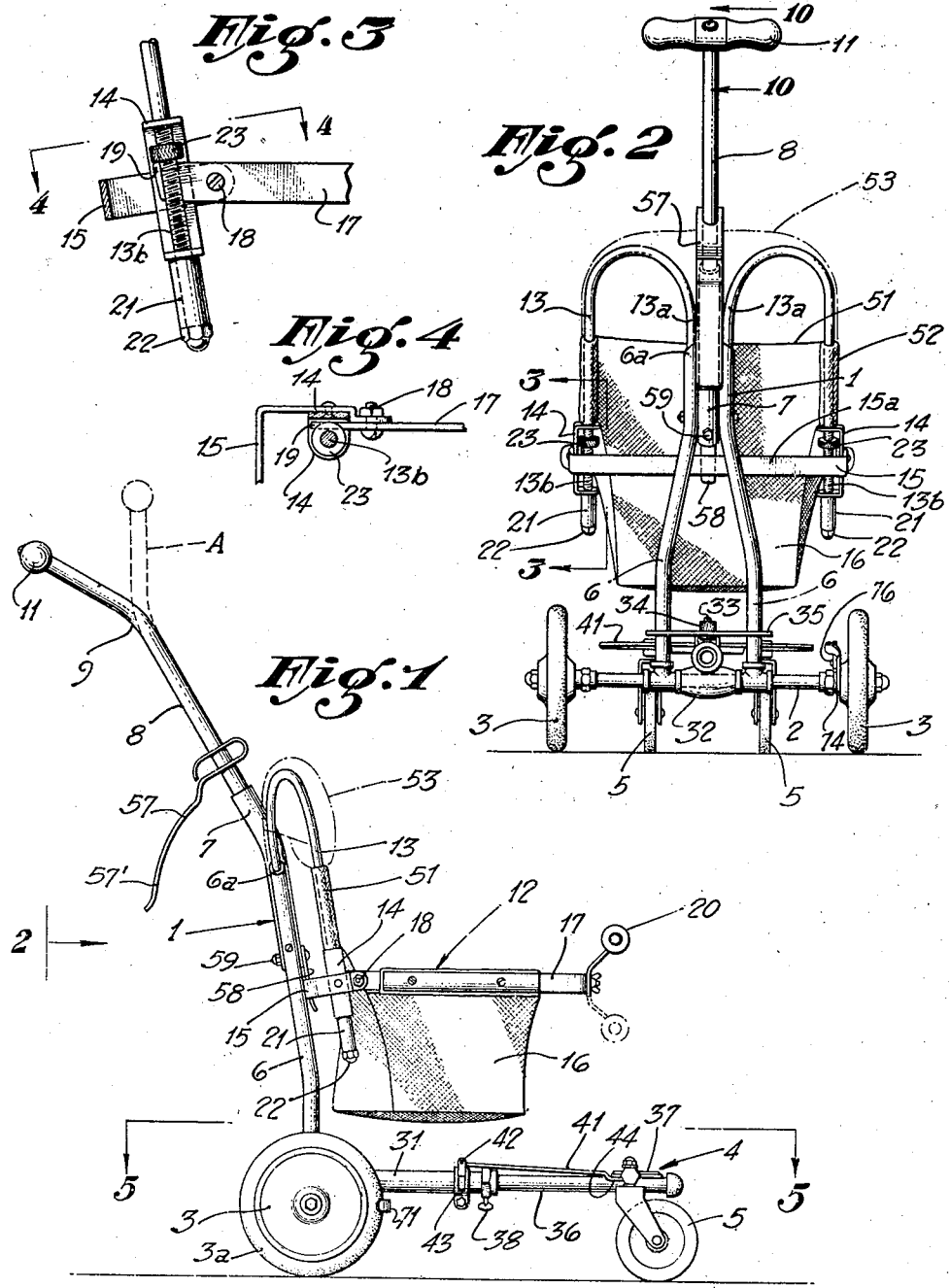
INVENTOR:
SUNTU LEE
BY Alfred W. Knight
ATTORNEY.

Aug. 4, 1942.　　　　S. LEE　　　　2,291,640
SEAT STRUCTURE
Filed April 18, 1941　　　3 Sheets-Sheet 2
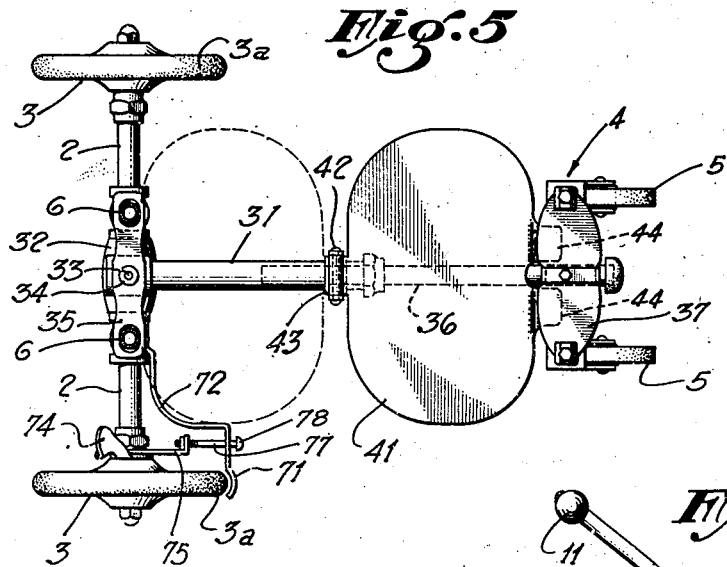
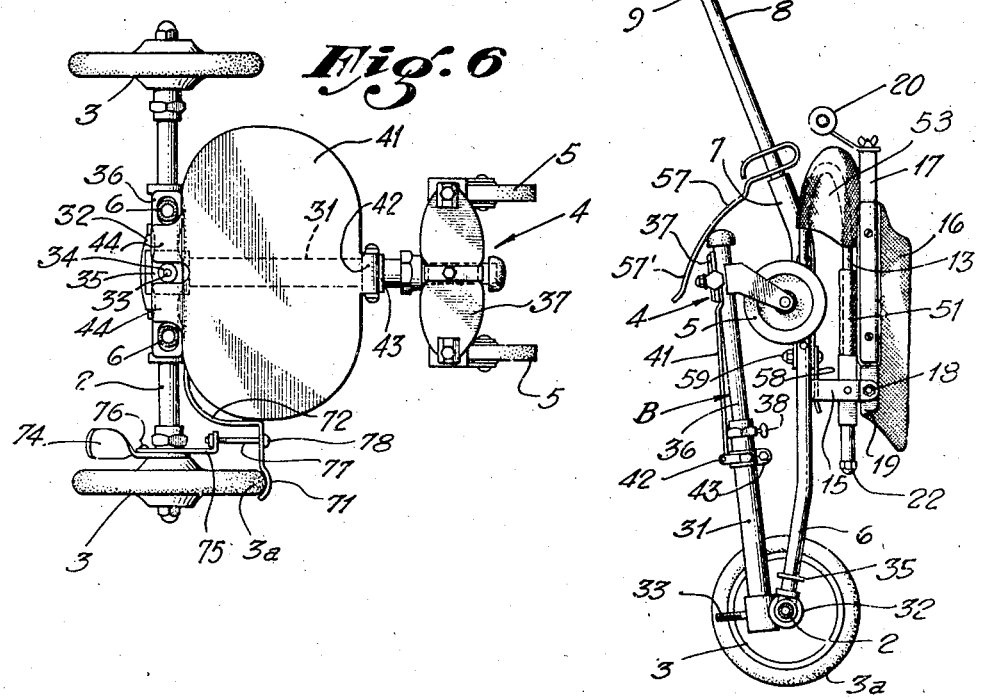
INVENTOR:
SUNTU LEE
BY Alfred N. Iniart
ATTORNEY.

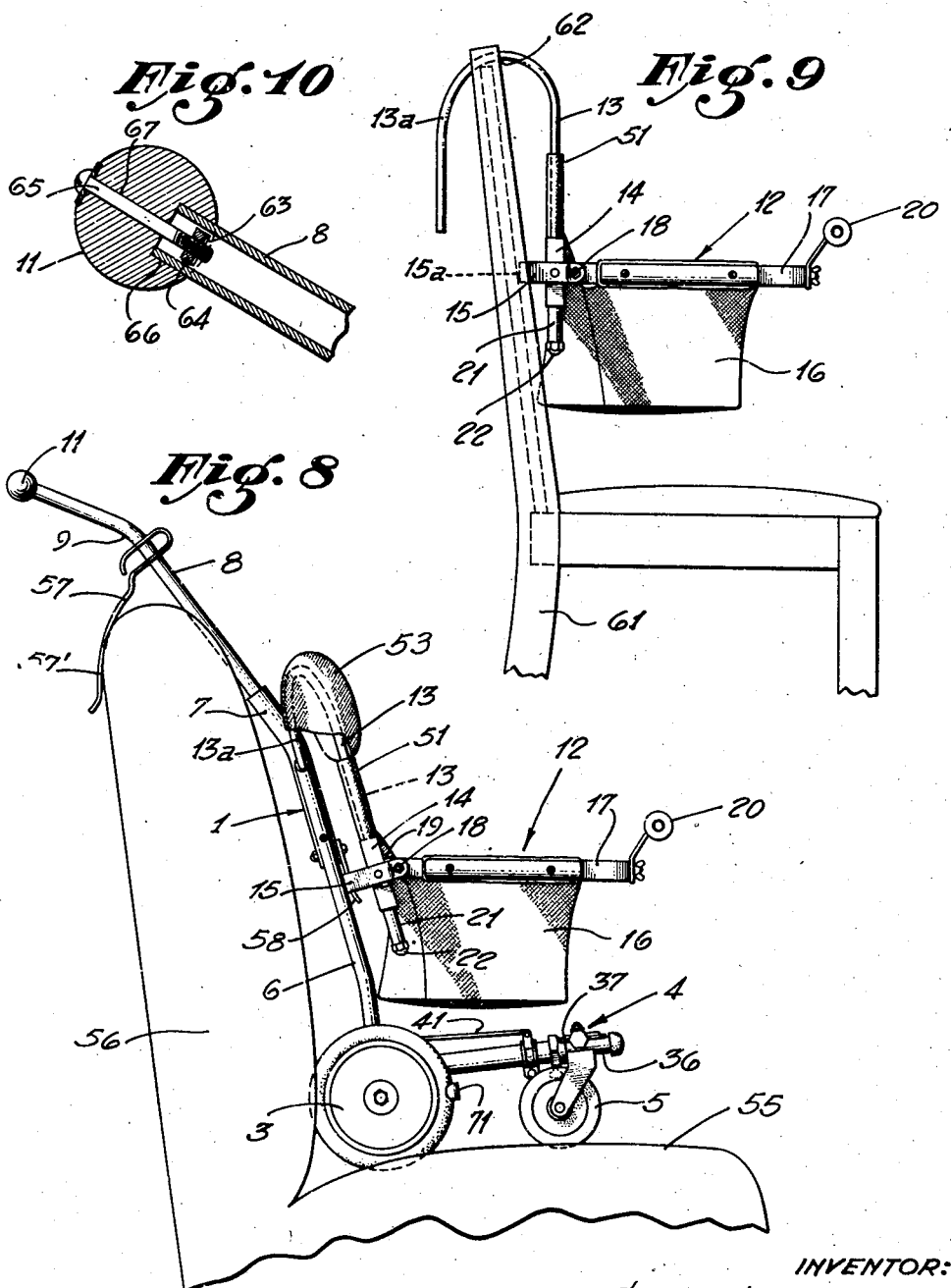

Patented Aug. 4, 1942

2,291,640

UNITED STATES PATENT OFFICE 2,291,640

SEAT STRUCTURE

Suntu Lee, Los Angeles, Calif.

Application April 18, 1941, Serial No. 389,246

5 Claims. (Cl. 155—79)

This invention relates to baby carts, and pertains particularly to a seat structure therefor. This application is a companion application to that entitled "Baby cart," filed concurrently herewith, and is directed specifically to a removable seat structure adapted for use in connection with a baby cart of the general type disclosed in said companion application.

One of the particular objects of this invention is to provide a seat structure embodying a support member adapted for attachment to a baby cart or the like, or to another relatively fixed support, in which the seat portion of the seat structure is pivotally disposed on the support member for angular adjustment with respect thereto whereby such seat portion may be established in a level or other desired position substantially independent of the angularity assumed by the support member in any particular use.

Other features and objects of the invention will be apparent from the ensuing description of a preferred embodiment thereof, as illustrated in the accompanying drawings and referring thereto:

Fig. 1 is a side elevation of a baby cart according to this invention, as it may be employed in actual use;

Fig. 2 is a rear elevation thereof;

Fig. 3 is a detail of the seat mounting adjustment, as taken on line 3—3 in Fig. 2;

Fig. 4 is a further detail of the structure shown in Fig. 3, as taken on line 4—4 therein;

Fig. 5 is a plan section of the lower portion of the structure, as taken on line 5—5 in Fig. 1, showing the forward support structure in extended position;

Fig. 6 is a view corresponding to Fig. 5, showing the forward support portion in retracted position;

Fig. 7 is a side elevation of the device in completely folded condition;

Fig. 8 illustrates the use of the cart construction in an automobile or the like wherein the entire cart is placed upon and is supported by the seat member of the automobile;

Fig. 9 illustrates the use of the removable seat portion of the device on the back of a conventional chair, in the provision of a so-called "high-chair"; and Fig. 10 is a sectional detail illustrating a preferred form of attachment for the operating handle portion of the construction, as taken on line 10—10 in Fig. 2.

Referring to Figs. 1 to 6 of the drawings, the construction may comprise a standard or frame formed of a vertical standard 1 and a transverse standard 2 carrying pivotally mounted wheels or the like 3, to which is attached a forward support portion 4 carrying a forward support wheel structure comprising one or more wheels or casters 5. The vertical standard may comprise two upwardly extending tubular members 6 secured at their lower ends to the transverse standard 2 and brought together at the upper ends and secured to a tubular center section 7. A tubular handle member may extend upwardly from the center section 7 as at 8, the handle member 8 being rotatably disposed within the tubular member 7 and bent over adjacent its upper end as at 9, terminating in a handle or gripping member 11. Suitable means, not shown, may be provided for fixing the rotative position of member 8 within the tubular member 7 so as to cause the same to adopt the position shown in full lines in Fig. 1, and alternatively the position shown in dotted lines at A in Fig. 1, which will effect an adjustment of the height of the gripping member 11 from the ground so as to more comfortably adapt the construction to use by a short or tall person.

The seat portion of the construction is illustrated generally at 12 and may comprise support arms 13 pivotally mounted on U shaped brackets 14 carried by a transverse yoke 15, the upper ends of the support arms 13 being bent inwardly and downwardly as at 13a and slidably disposed within the upper ends 6a of the tubular members 6. The seat proper may comprise a fabric member 16 of conventional shape secured to forwardly extending arm-rests 17 pivotally mounted on the transverse yoke 15 as at 18, the ends of the armrests 17 being extended rearwardly, as at 19, past the pivot point 18 into position alongside the lower ends 13b of the support arms 13. The lower ends 13b of the support arms 13 are threaded, and may be threadedly mounted on the brackets 14. The lower projecting ends of the support arms may be furnished with an enclosing sleeve 21 and a nut 22, if desired. A coactingly threaded thumb-nut or the like 23 is mounted on the support arm portion 13b within the bracket 14 and as illustrated particularly in Figs. 3 and 4 is employed to engage the upper edge of the rearwardly projecting portion 19 of the arm-rests 17 to fix the angularity of such arm-rests with respect to the standard 1. Independent of the adjustment at a particular angularity, and as shown particularly in Fig. 7, the arm-rests and the associated seat member 16 may be raised upwardly about the pivot 18 to a folded position substantially in line with the support arms 13, to fold the device.

The forward support portion 4 may comprise a tubular member 31 pivotally mounted as at 32 on the transverse support structure 2 and removably secured in position with respect to the standard 1 in any suitable manner, as through the agency of a fixed pin 33 secured to the portion 31 and disposed in substantial transverse alinement with the lower ends of the standard members 6, said pin being threaded and being adapted for engagement by a coactingly threaded thumb-nut 34 rotatably mounted on an anchor bar 35 slidably disposed on the lower ends of the members 6, as shown more particularly in Fig. 2. I order to fold the forward support structure so as to cause the device to encompass a minimum space the thumb-nut 34 may be backed off to clear the pin 33, and the forward support structure 4 rotated rearwardly to a position such as indicated at B in Fig. 7.

Slidably mounted within the tubular member 31 I provide an extension bar 36 carrying at its forward end the forward support portion 4 and the wheels or casters 5, the latter of which may conveniently be mounted on a forward transverse support structure 37. A suitable set screw or the like 38 is provided for affixing the extension bar 36 and the structure associated therewith in any desired position of extension with respect to the tubular member 31. This forward support structure is shown in retracted position in Fig. 6 and in an extended position in Fig. 5. A suitable foot plate is provided on which the child may rest its feet when the device is used as a cart, and this foot plate is indicated at 41, pivotally secured to the tubular member 31 as at 42 through a bracket or the like 43 which may be fixedly mounted on the member 31. In order to fixedly place the foot plate 41 in extended position (Fig. 5) I may provide a forwardly extending tab or the like 44 at each side of the mid-line of the plate 41, and adapted to extend at opposite sides of the extension bar 36 and beneath the forward transverse support structure 37, said tabs being secured in position by loosening the screw 38, pulling the bar 36 forwardly to carry the member 37 past the position of the tabs 44, lowering the foot plate 41 into position, and then pushing the extension bar 36 inwardly to cause the member 37 to pass over the tabs 44, in which position it will function as a detent means, after which the screw 38 may be locked. The lateral dimensions of the tabs 44 may conveniently be made such as to pass between the members 6 and to clear the pin 33 when the foot plate 41 is folded into retracted position as shown in Fig. 6. In this retracted position, with the arm 31 and the forward support portion 4 extended to the full forward position, the device is useful as a "walker." The arm-rest portion 17 of the seat 12 is preferably made of U shape to completely enclose the forward portion of the seat area, and the child may stand erect within such enclosure, with his feet on the floor or ground, holding onto a conveniently disposed handle or the like 20. As may be visualized from Fig. 5, ample room for leg movement is provided when the plate is folded back into the dotted position.

The seat member is conveniently provided with a backing piece as indicated at 51, of fabric or the like, formed as a part of the fabric seat member 16, if desired, and stitched about the support arms 13 as at 52. Similarly, a head cushion may be provided as indicated in dot-dash lines at 53 in Figs. 1 and 2, and in full lines in Fig. 8, which may be slipped down over the upwardly directed portions of the upper ends 13a of the support arms and secured to the backing 51 in any suitable manner. This head cushion may be removed when the seat structure is removed from the standard as described hereinbelow.

Referring to Fig. 8, it will be seen that the device may be lifted into the front seat of an automobile, for example, the wheels 3 seated firmly at the juncture of the seat cushion 55 and the back portion 56, and the structure held in position through the agency of a spring clamp member 57 slidably mounted on the handle 8 and having a depending portion 57' adapted to engage the rearward edge of the back portion 56 of the seat. (This clamp member 57 may also be employed to hold the forward support portion in the position "B," Fig. 7, as shown therein.) When the device is used as in Fig. 8, the forward support portion 4 will be placed in fully retracted position, and owing to the fact that the angularity of the back portion 56 of the automobile seat will be somewhat different from the angularity of the standard 1 with respect to the horizontal, which would cause, in the case illustrated in Fig. 8, the arm-rest 17 to be inclined upwardly into an uncomfortable position for the occupant, I preferably adjust the thumb-nuts 23 upwardly to permit the arm-rest 17 to drop down to a more nearly horizontal position.

Where the seat member 12 is removed from the standard 1 for use as illustrated in Fig. 9, the thumb-nuts 23 may be screwed down on the support arm 13b so as to raise the arm-rest 17 to a generally horizontal position or to any other desired angularity. The seat 12 is readily removed from the standard 1 by loosening a pivotally mounted spring clamp 58 from engagement with the cross bar 15a of the transverse yoke 15, and pulling the support arm portions 13a out of the tubular standard portions 6. The spring clamp 58 may be mounted upon the center section 7 through the agency of a bolt 59. The portions 13a of the support arms may then be hooked over the back of a chair or the like 61, as at 62. It will be appreciated that a rubber covering or the like, not shown, may be provided for the portions of the support arms which would engage the chair back, if desired, to avoid unduly marring the surface of the chair back. Furthermore, the two free ends 13a of the support arms may be forced toward one another through the agency of a strong rubber band, or the like, into a position corresponding to that adopted by the arms when installed upon the frame (see Fig. 2, for example) which would make the seat somewhat more stable in its mounting on a chair back.

The grip portion 11 of the handle 8 may be attached to the handle in any convenient manner, although I prefer to provide a transversely extending rectangular opening 63 at the upper end of the tubular handle 8 through which an elongated bar 64 may be passed, said bar being of a length slightly in excess of the diameter of such handle 8, to which a holding screw 65 is threadedly secured. The grip member 11 may be recessed as at 66 to receive the upper end of the handle 8, and the screw 65 may pass through a diametrical bore 67 in said grip member.

As shown more particularly in Figs. 2, 5, and 6, I prefer also to provide a brake member adapted to engage one of the wheels 33 so that the cart may be locked in position, and this brake may comprise a brake shoe 71 secured to or forming a part of a spring arm 72 secured to the transverse standard 2 at a position inwardly removed from a wheel 3. In order to pull the brake shoe 71 into engagement with the tire 3a of the wheel 3, I may provide an operating lever 74 pivotally mounted of the tubular standard 2 and carrying a link 75 pivotally mounted thereon as at 76, said link being adapted to engage the rearward end of a bolt 77 upon rearward downward movement of the lever 74 and pull the associated bolt head 78 into engagement with the spring arm 72 to cause the brake shoe to be pulled against the tire rim. The bolt 77 is conveniently passed through a corresponding opening in the spring arm 72.

The above-described embodiment will be understood to be illustrative only and I do not consider my invention limited thereto, but rather to the scope of the subjected claims.

I claim:

1. A seat construction for baby carts, and the like, which comprises: an upwardly extending support structure provided with means at the upper end thereof for engaging a main support upon which the seat construction is to be mounted; transversely spaced bracket members secured to the lower end of said upwardly extending support structure; a seat member secured to said support structure and including two forwardly extending arm-rest members pivotally attached adjacent their rearward ends to said bracket members for pivotal movement about a common axis, said arm-rest members having portions extending rearwardly of said common axis; and stop means movably mounted on said support structure and positioned to engage said rearwardly extending portions of said arm-rest members to limit the downward pivotal movement of said seat member.

2. A seat construction for baby carts, and the like, which comprises: two laterally spaced upwardly extending support members provided with means at their upper ends for engaging a main support upon which the seat construction is to be mounted; a bracket member secured to each of said upwardly extending support members; an arm-rest structure pivotally secured to said bracket members, said arm-rest structure comprising two transversely spaced forwardly extending arm members pivotally attached adjacent their rearward ends to the respective bracket members for pivotal movement about a transversely extending common axis, said arm members being each provided with a portion extending rearwardly of said common axis; stop means threadedly mounted on the lower ends of said upwardly extending members in position to engage said rearwardly extending portions of said arm members to limit the downward pivotal movement of said arm-rest structure; and a seat means secured to and supported by said arm members.

3. A seat construction for use on baby carts and the like, which comprises: two transversely spaced bracket members; a yoke member secured to and rigidly interconnecting said brackets; two transversely spaced upwardly extending support members respectively pivotally mounted at their lower ends on said brackets for rotation about the length of said support members, the upper ends of said support members having bent-over portions adapted for attachment to a main support structure upon which the seat construction is to be used; a seat structure pivotally mounted on said brackets for upward and downward pivotal movement about a transversely extending common horizontal axis and including portions extending forwardly and rearwardly of said common axis; and stop means movably mounted on the lower ends of said support members adjacent the position of said brackets and adapted to engage the upper surface of the rearwardly extending portions of said seat structure to limit the downward pivotal movement of said seat structure.

4. The structure set forth in claim 3, said stop means being threadedly mounted on the lower ends of said support members for adjustment along the length of said members.

5. A seat construction for use on baby carts and the like, which comprises: two transversely spaced bracket members; a yoke member secured to and rigidly interconnecting said brackets; two elongated upwardly extending support members disposed forwardly of said yoke member and pivotally secured at their lower ends to the respective brackets for rotative movement about their length, said yoke member having portions extending forwardly of said brackets past the pivotal attachment of said support members; a seat structure pivotally mounted on said forwardly extending portions of said yoke member for upward and downward pivotal movement about a transversely extending common horizontal axis, said seat structure including arm-rest members having portions extending forwardly of said axis and portions extending rearwardly of said axis alongside the lower ends of said support members; and stop means threadedly mounted on the lower ends of said support members in position to engage the upper surface of said rearwardly extending portions of said arm-rest members to limit the downward pivotal movement of said seat structure.

SUNTU LEE.